United States Patent
Fukushima (10) Patent No.: US 7,254,613 B2
(45) Date of Patent: Aug. 7, 2007

(54) MAIL DELIVERY SERVER, MAIL DELIVERY PROGRAM STORAGE MEDIUM, AND MAIL DELIVERY METHOD

(75) Inventor: Takahiro Fukushima, Inagi (JP)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 10/322,710

(22) Filed: Dec. 19, 2002

(65) Prior Publication Data

US 2003/0236846 A1 Dec. 25, 2003

(30) Foreign Application Priority Data

Jun. 24, 2002 (JP) ............................. 2002-182655

(51) Int. Cl.
*G06F 15/13* (2006.01)

(52) U.S. Cl. ..................... 709/206; 709/238; 709/246

(58) Field of Classification Search ................ 709/206, 709/238, 246
See application file for complete search history.

(56) References Cited

U.S. PATENT DOCUMENTS

| | | | | |
|---|---|---|---|---|
| 6,141,695 A | * | 10/2000 | Sekiguchi et al. | .......... 709/246 |
| 6,219,714 B1 | * | 4/2001 | Inhwan et al. | .............. 709/238 |
| 6,625,642 B1 | * | 9/2003 | Naylor et al. | ............... 709/206 |
| 6,816,911 B1 | * | 11/2004 | Toyoda et al. | .............. 709/238 |
| 2002/0194286 A1 | * | 12/2002 | Matsuura et al. | ........... 709/206 |
| 2006/0031364 A1 | * | 2/2006 | Hamilton et al. | ........... 709/206 |

FOREIGN PATENT DOCUMENTS

| JP | 11-154969 | 6/1999 |
|---|---|---|
| JP | 2001-075893 | 3/2001 |
| JP | 2001-345991 | 12/2001 |

* cited by examiner

Primary Examiner—Jinsong Hu
(74) Attorney, Agent, or Firm—Staas & Halsey LLP (57) ABSTRACT

The present invention relates to a mail delivery server for sending electronic mail to a recipient side mail delivery server for administering a mail address entered in a destination field of the received electronic mail, and delivers a mail reply from a mail recipient administered by a mail delivery server that can not handle other communications means, such as fax, to a person receiving information using other communication means such as fax. When a destination to be sent to using communication means other than electronic mail, for example fax, is entered in the destination field of a received electronic mail, information of the same content as the content of that electronic mail is sent using fax or the like, and that electronic mail is sent to the mail recipient side by changing the destination to be sent to using fax to a mail address format.

12 Claims, 10 Drawing Sheets

| TO: | 0312345678, receiver@smtp.mailserver2.com |
|---|---|
| CC: | |
| Subject: | NOTIFICATION OF DATE OF NEXT MEETING |
| From: | sender@smtp.mailserver1.co.jp |
| (CONTENT) | |

FIG. 6

| TO: | receiver@smtp.mailserver2.com |
|---|---|
| CC: | 0312345678@smtp.mailserver1.co.jp |
| Subject: | NOTIFICATION OF DATE OF NEXT MEETING |
| From: | sender@smtp.mailserver1.co.jp |
| (CONTENT) | |

FIG. 7

| TO: | sender@smtp.mailserver1.co.jp |
|---|---|
| CC: | 0312345678@smtp.mailserver1.co.jp |
| Subject: | Re:NOTIFICATION OF DATE OF NEXT MEETING |
| From: | receiver@smtp.mailserver2.com |
| (CONTENT) | |

FIG. 8

| TO: | sender@smtp.mailserver1.co.jp |
|---|---|
| CC: | 0312345678 |
| Subject: | Re:NOTIFICATION OF DATE OF NEXT MEETING |
| From: | receiver@smtp.mailserver2.com |
| (CONTENT) | |

MAIL DELIVERY SERVER, MAIL DELIVERY PROGRAM STORAGE MEDIUM, AND MAIL DELIVERY METHOD

BACKGROUND OF THE INVENTION

1. Field of the Invention

The present invention relates to a mail delivery server for transmitting electronic mail to a receiver side mail delivery server administering mail addresses entered in a destination column of a received electronic mail, a method therefor, and a mail delivery program storage medium storing a mail delivery program, executed in an information processing device for executing programs, for causing the information processing device to operate as a mail delivery server, and to.

2. Description of the Related Art

With the increasing spread of the Internet, use of electronic mail, which is one function of the Internet, has become increasingly popular.

It is common practice for the destination of electronic mail messages to be designated using an internet mail address having the format nnn@domain.com. However, in the case of this electronic mail system, it is necessary for all users to have an internet mail address, and it is not possible to use e-mail as a means of communication for people who do not use the Internet. Also, despite the fact that use of the Internet is becoming widespread, there are still a lot of people who do not use the Internet.

In order to address these points, a technique has been considered where it is permitted to enter a facsimile (fax) or telephone number in the destination field of the electronic mail, and that electronic mail is converted to fax information or voice information by the mail delivery server that receives that electronic mail, and the information is sent to the destination indicated by the fax number or telephone number.

However, since there is not just one mail delivery server but numerous mail servers on the Internet, the above-proposed technique will suffer from the following problems unless it is applied to absolutely all mail delivery servers on the Internet. Specifically, in the case where a mail recipient receiving an electronic mail containing both a mail address and a fax number in the electronic mail destination field carries out a broadcast transmission of electronic mail to all people in the destination field of that email, if a recipient side mail delivery server used by the mail recipient does not handle processing of fax number etc, processing at the mail delivery server receiving the electronic mail broadcast transmitted from that recipient will return an error for the fax number part, and there is a problem that the electronic mail will not be processed correctly.

Alternatively, in the case where a mail message is delivered after a fax number etc. is deleted by the mail delivery server at the mail sender side capable of carrying out processing for the fax number etc. in order to prevent the above described error from occurring, there is a problem that it will not be possible to include anyone who receives the information using a fax in a broadcast reply.

A technique for including a fax number or the like within an internet type mail address and then performing fax transmission at a server for administering that mail address is disclosed in Japanese Patent Laid-open No. Hei. 11-154969.

With this technique, it is possible to receive electronic mail at a server for carrying out transmission of a fax number etc. and to transmit the fax etc., even if another server does not have the capability to perform processing of a fax number or the like.

However, in this case, a person wishing to receive the electronic information by fax etc., and not by electronic mail, or a person wishing to deliver information by fax etc., must also subscribe to a system providing a service for transmitting electronic mail information by fax etc., as well as subscribing to an electronic mail system, and a sender of mail performing transmission that includes transmission to a fax etc. must ensure that messages are transmitted not with the fax number simply entered in the destination but prepared in a correct mail address format, and the technique proposed in the above publication does not describe anything pertaining to realistically resolving the above problems.

SUMMARY OF THE INVENTION

The present invention has been conceived in view of the above described problems, and an object of the invention is to provide a mail delivery server that can deliver mail to a person receiving information using other communication means besides electronic mail, such as a fax etc., even in a reply from a mail recipient administered by a mail delivery server that does not handle other communication means, such as fax, etc., a method therefor, and a mail delivery program storage medium storing a mail delivery program.

A mail delivery server of the present invention for achieving the above described object transmits electronic mail to mail addresses entered in a destination field of a received electronic mail, and comprises an other communication means transmission section transmitting contents of a received mail to a destination that uses specified other transmission means besides electronic mail, using the other transmission means, in the event that the destination that uses the other transmission means is included in the destination field of the received electronic mail, and an electronic mail transmitter carrying out transmission by changing a destination that uses the other transmission means described in the destination field of the received electronic mail to a mail address containing information indicating the destination and its own mail delivery server address.

When a destination that uses other communication means besides electronic mail, for example fax communication means, is included in the destination field of a received electronic mail, the mail delivery server of the present invention uses the other communication means, such as fax, to transmit information of the same content as that electronic mail.

Here, the mail delivery server transmits the electronic mail to the mail recipient side by changing the destination to a mail address format when a destination that uses other communication means such as fax does not conform to the mail address format.

If a mail recipient carries out a broadcast reply, even if the mail delivery server administrating that recipient does not handle processing for other communication means, such as fax, the electronic mail for that reply does not generate an error at the recipient side mail delivery server because there is an address in mail address format, and is correctly returned to the mail delivery server administrating the mail sender who sent the original electronic mail. Since the mail delivery server administrating the mail sender who sent the original electronic mail recognizes that the rely is to an electronic mail that it changed, that reply mail can be sent to that destination using other communication means, such as fax.

Here, in the mail delivery server of the present invention, the electronic mail transmitter preferably transmits electronic mail by returning the destination to a destination having a format before being changed to a mail address format, when a destination that uses the other communication means is included in a mail address format in the destination field of the received electronic mail.

The fact that the destination that uses other communications means such as fax has been changed to a mail address format at the mail delivery server, and the address in the mail format is useless information as far as the original mail sender is concerned, and at the time of a reply it is preferable to send a reply by returning that destination to its original format.

In the mail delivery server of the present invention, in changing the destination that uses the other communication means to a mail address, the electronic mail transmitter preferably changes the destination to a mail address having its own address added to the destination.

In changing the destination that uses other means of communication, such as fax, to a mail address, it is not necessary to include that destination itself in the mail address, and it is possible to store the destination itself inside the mail delivery server and to include link information to that destination in the changed mail address, instead of that destination itself. The above-described "information indicating the destination" can include the destination itself, or can be information other than the destination itself as long as there is information indicating the destination.

In the mail delivery server of the present invention, the other communication means can be fax or telephone, but typically a fax (facsimile) is adopted.

In order to achieve the above described object, there is also provided a mail delivery program, stored in a mail delivery program storage medium of the present invention, and executed in an information processing device for executing programs, causing the information processing device to function as a mail delivery server for transmitting electronic mail to mail addresses defined in a destination field of a received electronic mail, the information processing device being caused to act as a mail delivery server comprising an other communication means transmission section transmitting contents of a received mail to a destination that uses specified other transmission means besides electronic mail, using the other transmission means, in the event that the destination that uses the other transmission means is included in the destination field of the received electronic mail, and an electronic mail transmitter carrying out transmission by changing a destination that uses the other transmission means described in the destination field of the received electronic mail to a mail address containing information indicating the destination and its own mail delivery server address.

With the mail delivery program stored in the mail delivery program storage medium of the present invention, the information processing device can be caused to act as the mail delivery server of the present invention.

It is possible to include all of the various aspects of the mail delivery program implementing all of the various aspects of the mail delivery server of the present invention in the mail delivery program stored in the mail delivery program storage medium of the present invention.

According to the present invention, it is possible to deliver a mail reply from a mail recipient administrated by a mail delivery server that can not handle other communications means, such as fax, to a person receiving information using other communication means such as fax.

In order to achieve the above described object, there is also provided a method of delivering mails that transmits electronic mail to mail addresses described in a destination field of a received electronic mail. The method has the step of transmitting contents of a received mail to a destination that uses specified other transmission means besides electronic mail, using the other transmission means, in the event that the destination that uses the other transmission means is included in the destination filed of the received electronic mail, and further, the step of carrying out transmission by changing a destination that uses the other transmission means described in the destination field of the received electronic mail to a mail address containing information indicating the destination and an own mail delivery server address.

The method of delivering mails of the present invention includes various modifications corresponding to various modifications of the mail deliver server realized according to the present invention.

DESCRIPTION OF THE PREFERRED EMBODIMENTS

The mail system of the embodiment described in the following is made up of a mail client for requesting creation and transmission of electronic mail or receiving electronic mail from another client (mail software) via a mail delivery server, and a mail delivery server capable of sending and receiving electronic mail between the mail clients.

The mail delivery server performs exchange of electronic mail messages received from a mail client using a specified communications protocol, for example the well known SMTP (Simple Mail Transfer Protocol) between other mail delivery servers transmitting to destinations defined in header information of the received electronic mail messages. A function for receiving electronic mail for its own mail client from another mail delivery server and supplying the electronic mail to the mail client is also provided.

The mail client requests electronic mail transmission using the mail delivery server, and receives electronic mail for its own addresses from the mail delivery server. In this embodiment the above described SMTP and also known POP (Post Office Protocol) can be adopted as communications protocols used by the mail client to exchange electronic mail with the mail delivery server.

Figure 1:
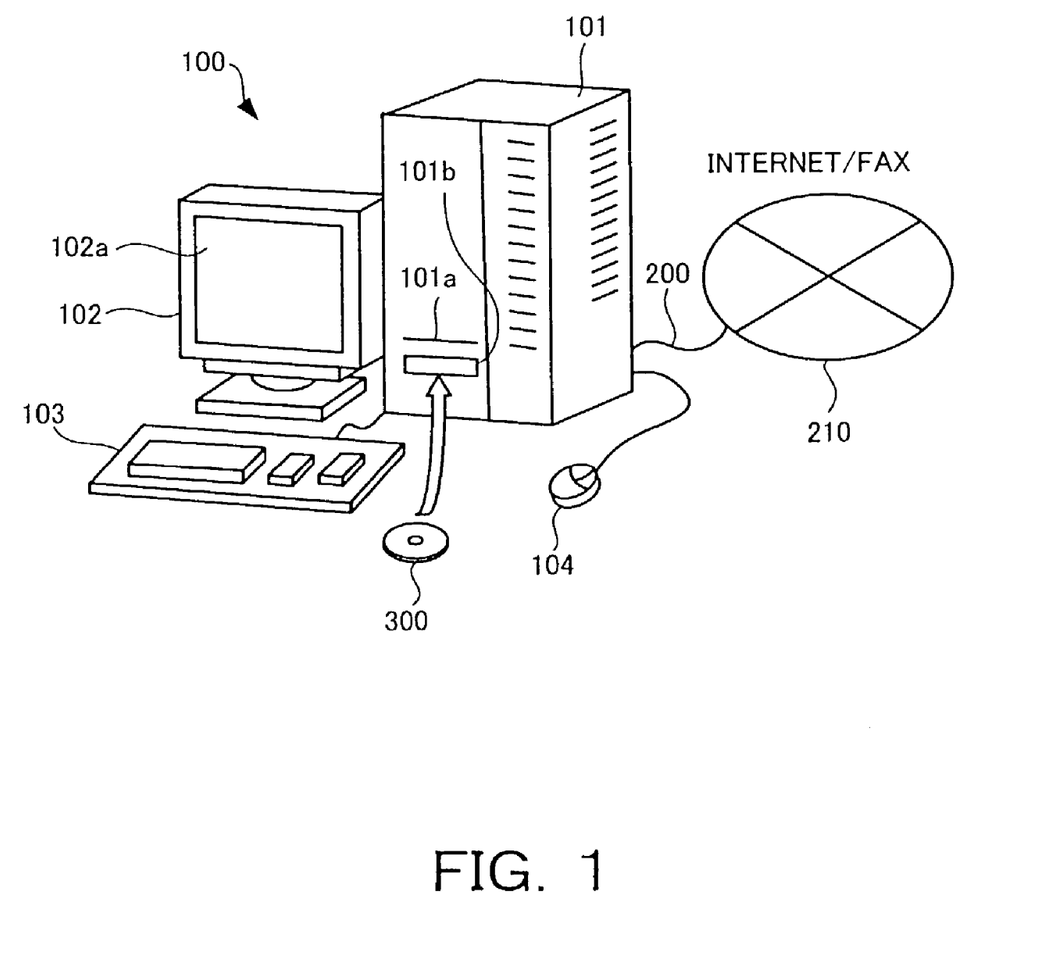
FIG. 1 is an external perspective view of a server machine operating as mail delivery server of an embodiment of the invention.

FIG. 1 is an external perspective view of a server machine operating as a mail delivery server of this embodiment.

This server machine 100 is provided in the form of a computer, and comprises a CPU (Central Processor unit), RAM (random access memory), a hard disk, a main body section 101 housing a communications board etc., a display unit 102 for displaying images and character strings on a display screen 102a as a result of commands from the main body section 101, a keyboard 103 for inputting operator commands to the server machine 100, and a mouse 104 for designating an arbitrary position on the display screen 102a to input commands in response to icons or the like displayed at that position on the screen at the time of designation.

The main body section 101 also has, looking from the exterior, an FD loading slot 101a and a CD-ROM loading slot 101b through which floppy discs (FD, not shown) and CD-ROMs 300 are respectively loaded, and inside these components an FD drive and CD-ROM drive are also installed for driving the flexible disk (FD) and CD-ROM 300 loaded from the loading slots 101a and 101b to access them.

This server machine 100 is connected via a communications cable 200 to a communications network 210 for transmitting information by communication means such as the Internet, fax and telephone. A large number of client machines using this server machine as a mail delivery server, other mail delivery servers, besides the server machine shown here, a large number of client machines using these mail delivery servers, and also a large number of faxes and telephones, are connected to this communications network 210 (not shown in the drawings).

Figure 2:
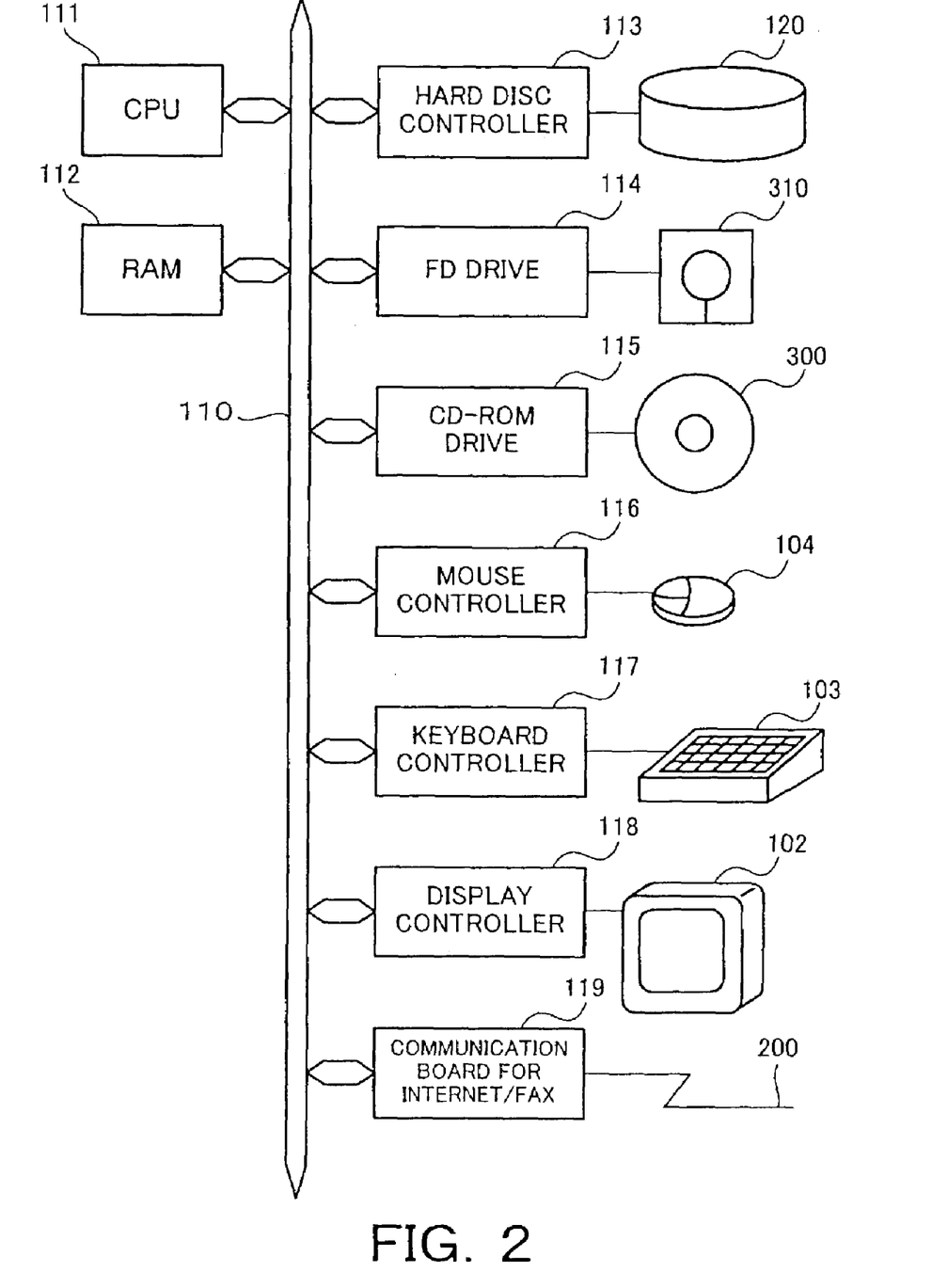
FIG. 2 is a schematic diagram of the hardware structure of a server machine having the exterior appearance shown in FIG. 1.

FIG. 2 is a schematic drawing of the hardware structure of the server machine having the external appearance shown in FIG. 1.

The hardware structure diagram shows the CPU 111, RAM 112, hard disc controller 113, FD drive 114, CR-ROM drive 115, mouse controller 116, keyboard controller 117, display controller 118, and a communications board 119 capable of bi-directional communication between the Internet and a fax, with these components being connected to each other by a bus 110.

Figure 3:
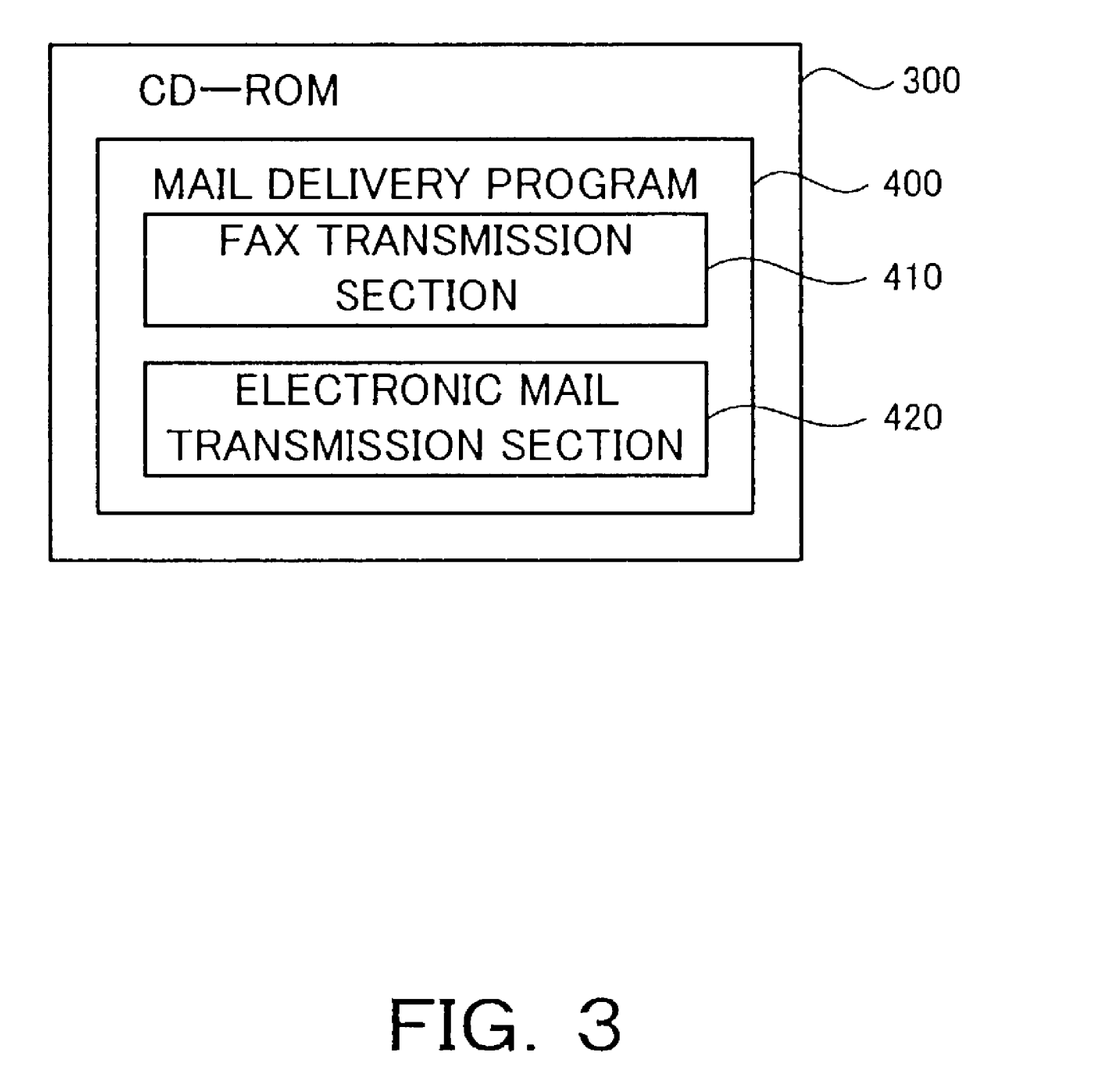
FIG. 3 is a schematic diagram showing an overview of one embodiment of a mail delivery program storage medium of the present invention.

The FD drive 114 and CD-ROM drive 115, as described with reference to FIG. 3, are for accessing an FD 310 and CD-ROM 300 that have been loaded from the FD loading slot 101a and the CD-ROM loading slot 101b. The communications board 119 is connected to the communications network 210 (refer to FIG. 1) via a communications line 200.

A hard disc 120 accessed using the hard disc controller 113, a mouse 104 controlled by the mouse controller 116, a keyboard 103 controlled by the keyboard controller 117 and a CRT display 102 controlled by the display controller 118 are also shown in FIG. 2.

FIG. 3 is a schematic drawing showing an overview of one embodiment of the mail delivery program storage medium of the present invention.

Here, a mail delivery program 400 is stored in the CD-ROM 300, this CD-ROM 300 is loaded from the CD-ROM loading slot 101b shown in FIG. 1, accessed using the CD-ROM drive 115 of FIG. 2, and the mail delivery program 400 stored in the CD-ROM 300 is installed in the mail server machine 100 shown in FIG. 1 and FIG. 2. Once the mail delivery program installed in the server machine 100 is executed on the server machine 100, the server machine 100 will operate as one embodiment of the mail delivery server of the present invention.

The mail delivery program 400 is shown in this example stored in the CD-ROM 300, but it need not necessarily be stored in a CD-ROM, and it is possible to store the program in another removable storage medium such as a floppy disc, for example, and installed in the server machine 100, installed in the server machine 100 from another device via the communications network 210, stored in advance on the hard disc 120 (refer to FIG. 2) of the server machine 100, or in fact held or stored anywhere as long as it is ultimately executable on the server machine.

The mail delivery program 400 shown in FIG. 3 is made up of a fax transmission section 410 and an electronic mail transmission section 420. Operation of the fax transmission section 410 and the electronic mail transmission section 420 will be described together with a description of FIG. 4.

Figure 4:
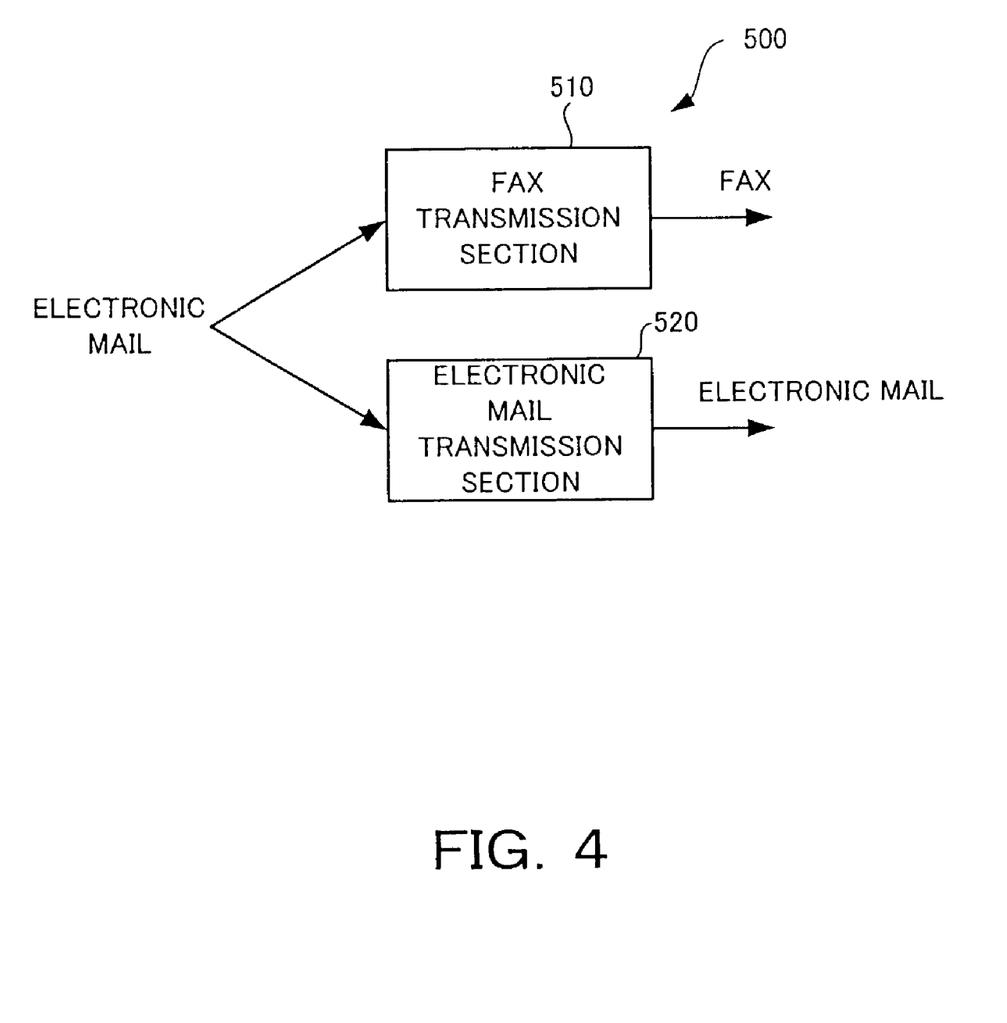
FIG. 4 is a block diagram showing an overview of one embodiment of a mail delivery server of the present invention.

FIG. 4 is a block diagram showing an overview of one embodiment of a mail delivery server of the present invention.

This mail delivery server 500 is implemented inside the server machine 100 of FIG. 1 and FIG. 2 by executing the mail delivery program 400 shown in FIG. 3 in the server machine 100 shown in FIG. 1 and FIG. 2.

The mail delivery server 500 of FIG. 4 is made up of a fax transmission section 510 and an electronic mail transmission section 520. The fax transmission section 510 and the electronic mail transmission section 520 respectively correspond to the fax transmission section 410 and the electronic mail transmission section 420 of the mail delivery program 400 shown in FIG. 3, but whereas the fax transmission section 510 and electronic mail transmission section 520 constituting the mail delivery server 500 of FIG. 4, are formed from a combination of the hardware of the server machine 100 shown in FIG. 1 and FIG. 2 and the operating system (OS) running in the server machine 100 and the mail delivery program 400 shown in FIG. 3 that runs on that OS, the fax transmission section 410 and electronic mail transmission section 420 constituting the mail delivery program 400 shown in FIG. 3 are formed from only application programs within that combination of elements. Operation of the fax transmission section 410 and electronic mail transmission section 420 constituting the mail delivery program 400 shown in FIG. 3 when this mail delivery program 400 is executed in the server machine 100 of FIG. 1 and FIG. 2 is actually operation of the fax transmission section 510 and electronic mail transmission section 520 constituting the mail delivery server 500 shown in FIG. 4, and in the following, operation of the fax transmission section 410 and electronic mail transmission section 420 constituting the mail delivery program 400 of FIG. 3 will be described through description of the operation of the fax transmission section 510 and electronic mail transmission section 520 constituting the mail delivery server 500.

The mail delivery server 500 shown in FIG. 4 is a mail delivery server for sending electronic mail to a recipient side mail delivery server for administering mail addresses entered in the destination field of received electronic mail, and is made up of the fax transmission section 510 and the electronic mail transmission section 520.

The fax transmission section 510 is one example of the other communication means mentioned in the present invention, and when the destination field of electronic mail received by this mail delivery server 500 contains a destination that uses specified other communication means (in this embodiment fax) besides electronic mail, this fax transmission section 510 uses fax to send information of the same content as that electronic mail to the destination that uses fax.

Here, the fax transmission section 410 of the mail delivery program 400 shown in FIG. 3, that implements the function of the fax transmission section 510 constituting the mail delivery server 500 of FIG. 4, realizes all of the functions of the fax transmission section 510 of the mail delivery server 500 of FIG. 4, but this is not limiting. Specifically, by providing the fax function itself using structural elements (other hardware and software) that are different from the mail delivery program 400 of FIG. 3, the fax transmission section 410 of the mail delivery program 400 of FIG. 3 can supplement the fax function provided by the different structural elements, that is, processing up to instructing transmission of electronic mail content by fax can be implemented for those different structural elements.

Specifically, when the fax transmission section 410 of the mail delivery program 400 of FIG. 3 is executed on the server machine 100 shown in FIG. 1 and FIG. 2, it is also possible for the fax transmission section 410 to provide the above mentioned structural elements with a fax number and content of an electronic mail by converting such content to fax data so as to enable fax communication using the structural elements, or if the structural elements themselves also have a function to convert from text data to fax data, it is possible for the fax transmission section 410 to provide the structural elements with a fax number and text data that is part of the message body of an electronic mail (and also header information) so as to enable fax transmission of that text data. Either of these formats is included within the scope of the mail delivery program stored in the mail delivery program storage medium of the present invention.

Also, when a destination that uses fax is contained in the destination field of a received electronic mail, the electronic mail transmission section 520 sends that electronic mail to a recipient side mail delivery server for administering mail addresses of destinations except for a destination using fax, if the destination that uses fax is included among destinations entered in the destination field of the received electronic mail and that destination that uses fax is in a format other than mail address format, by changing that fax destination to a mail address created by adding its own mail delivery server address to the fax destination. Also, when a destination that uses fax is included in the destination field of the received mail and the destination that uses fax is a destination in a mail address format, the electronic mail transmission section 520 transmits that electronic mail by returning that destination to a destination in a format before alteration to a mail address format.

The mail delivery server of the present invention will be described more specifically in the following.

Figure 5:
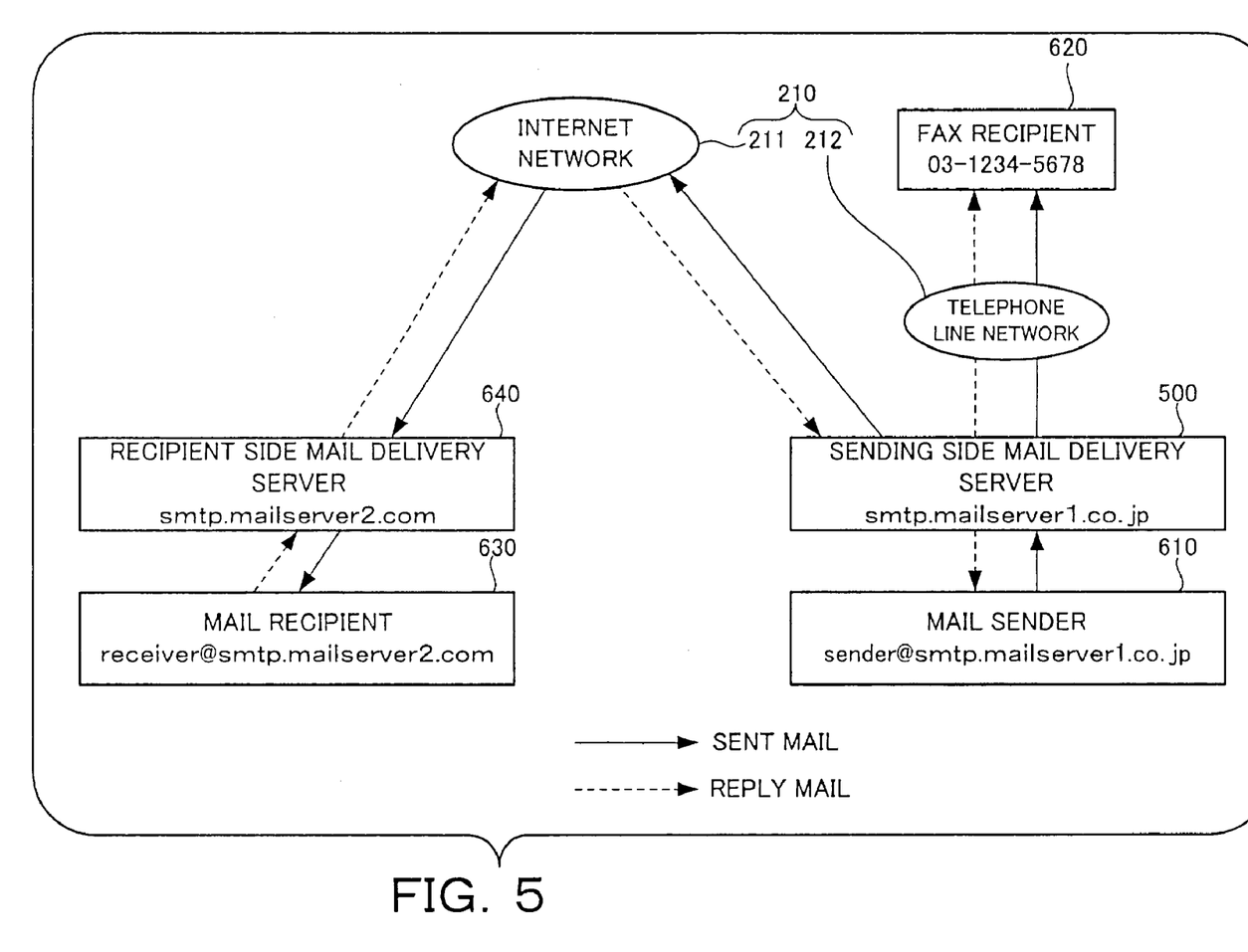
FIG. 5 is a schematic diagram showing an electronic mail system, including a mail server of one embodiment of the present invention.

FIG. 5 is a schematic drawing showing an electronic mail system including one embodiment of the mail delivery server of the present invention.

FIG. 5 shows a sending side mail delivery server 500 as one embodiment of the mail delivery server of the present invention, and a mail sender side electronic mail terminal 610 (hereafter referred to simply as a mail sender 610), a fax receiving terminal 620 (hereafter referred to simply as fax recipient 620) owned by a fax recipient, a mail recipient side electronic mail terminal 630 (hereafter referred to simply as mail recipient 630), and a recipient side mail delivery server 640 used by the mail recipient 630, as well as a communications network 210 (refer to FIG. 1) divided into the Internet network 211 and a telephone line network 212. Here, the sending side mail delivery server 500 has a fax transmission function, described in the following, but it is also possible for the recipient side mail delivery server 640 to have only normal electronic mail delivery functions and not have a fax transmission function FIG. 6 is a drawing showing the structure of an electronic mail addressed to the fax recipient 620 and the mail recipient 630 by the mail sender 610.

Figure 6:
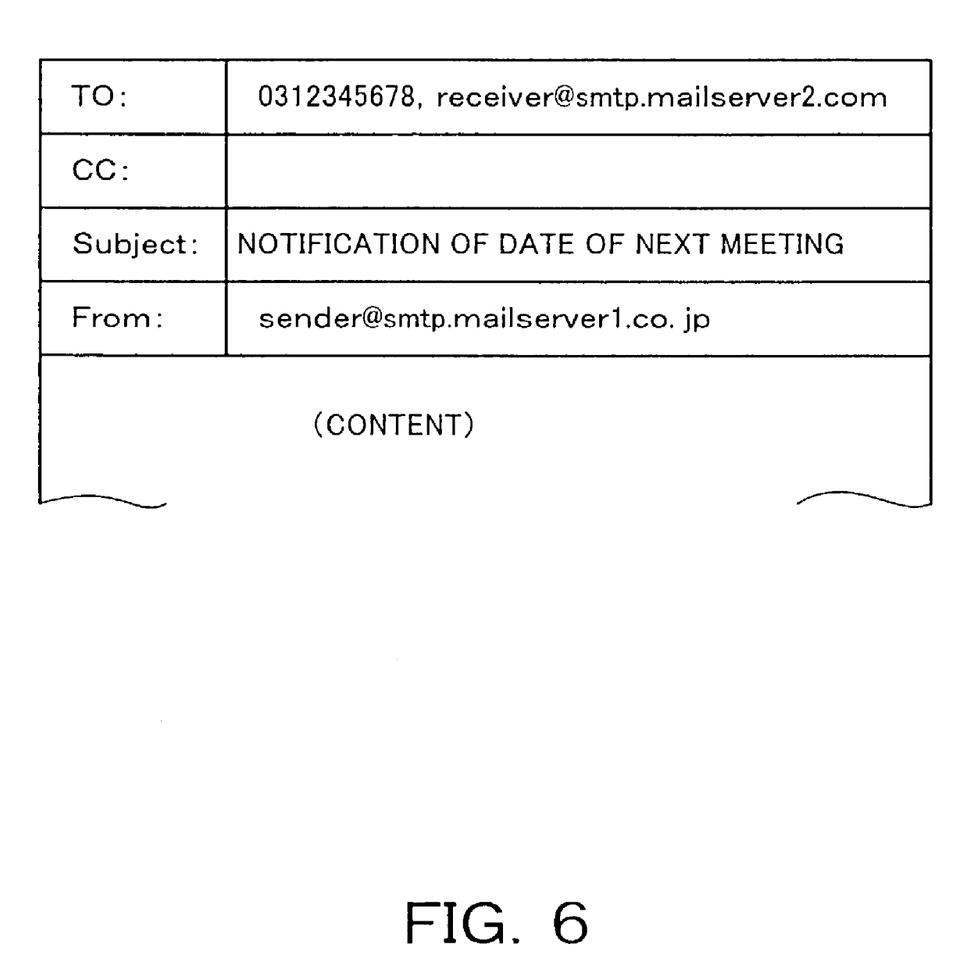
FIG. 6 is a drawing showing the structure of an electronic mail addressed by a mail sender to a fax recipient and a mail recipient.

In FIG. 6, a telephone number (fax number) of the fax recipient 620, namely "0312345678", and a mail address of the mail recipient 630, namely "receiver@smtp.mailserver2.com" are entered into the TO field designating the destination of this electronic mail. In FIG. 6, there is an empty CC field, but the CC field is also for email addresses of mail recipients 630, and this CC field is the same as the TO field in that a mail message is also sent to the address entered into this field, and in this example both the TO and CC fields are electronic mail destination fields.

The subject field is for the title of this electronic mail, and in FIG. 6 is entered as "Notification of date of next meeting".

The from field is for the mail address of the sender of the electronic mail, and in the electronic mail of FIG. 6 it contains "sender@smtp.mailserver1.co.jp"; which is the mail address of the mail sender 610 shown in FIG. 5.

The content of this email is entered into the text body field.

If the electronic mail of FIG. 6 is sent by the mail sender 610 of FIG. 5, the electronic mail is received by the sending side mail delivery server 500 and the following processing is executed by the sending side mail delivery server 500.

Figure 7:
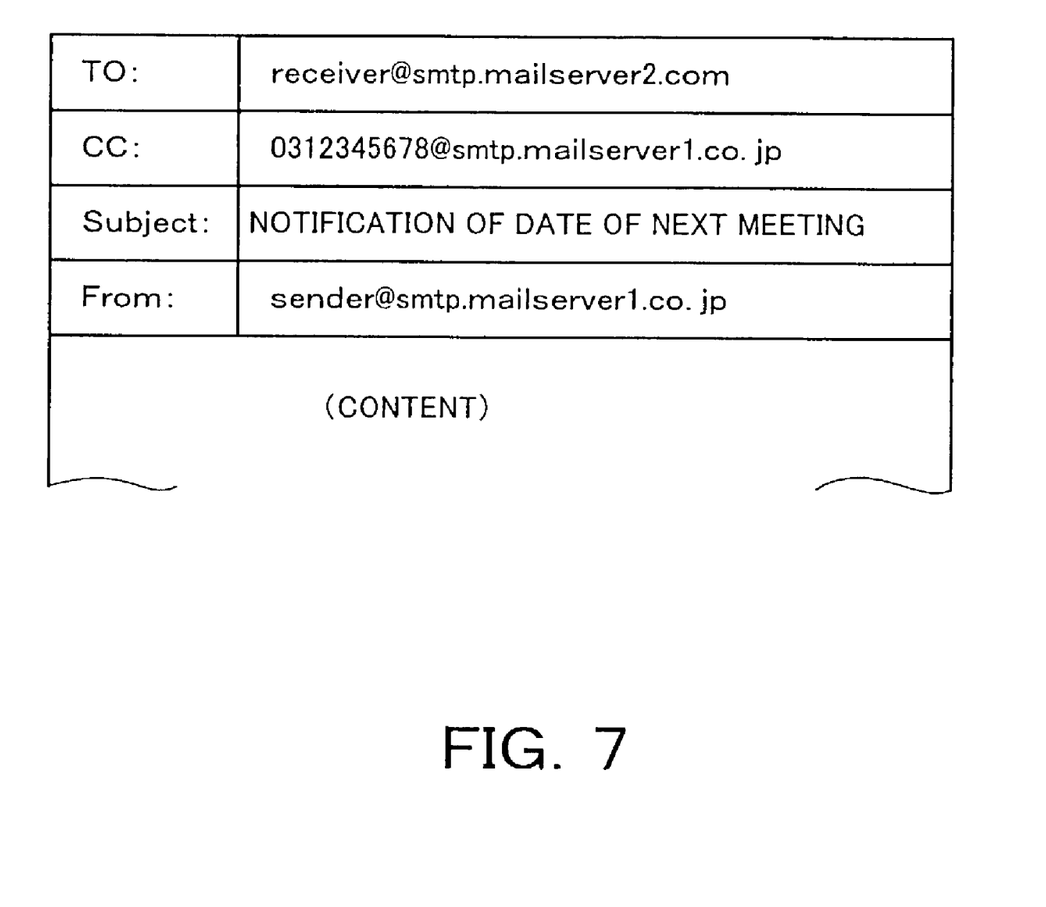
FIG. 7 is a drawing showing the structure of an electronic mail after being changed by the sending side mail delivery server.

Since a destination consisting of only digits is entered in the TO field of the electronic mail shown in FIG. 6, that destination is treated as a destination using fax, and the content of the electronic mail is addressed to that telephone number (fax number) "03-1234-5678" and sent by fax to the telephone network 2, and the electronic mail is also changed as shown in FIG. 7 and sent.

FIG. 7 is a drawing showing the structure of an electronic mail after being changed by the sending side mail delivery server 500.

The telephone number (fax number) "0312345678" entered in the TO field in FIG. 6 is deleted from the TO field, and instead of that telephone number (fax number) a mail address "0312345678@smtp.mailserver1.co.jp" made by adding the address of the sending side mail delivery server 500 "smtp.mailserver1.co.jp" after that telephone number (fax number) is entered in the CC field. Similarly to FIG. 6, it is also possible to enter this address in the TO field instead of the CC field.

In this way, the electronic mail having the structure shown in FIG. 7, with the telephone number (fax number) changed to a mail address, is sent from the sending side mail delivery server 500.

The electronic mail shown in FIG. 7, transmitted from the sending side mail delivery server 500, is received by the recipient side mail delivery server 640, via the Internet network 211, and that electronic mail is also sent from the recipient side mail delivery server 640 to the mail recipient 630 in response to a request from the mail recipient 630, being the final recipient of that electronic mail, and is received by that mail recipient 630.

Next, a reply mail to the electronic mail shown in FIG. 7 received this time is sent by the mail recipient 630.

Figure 8:
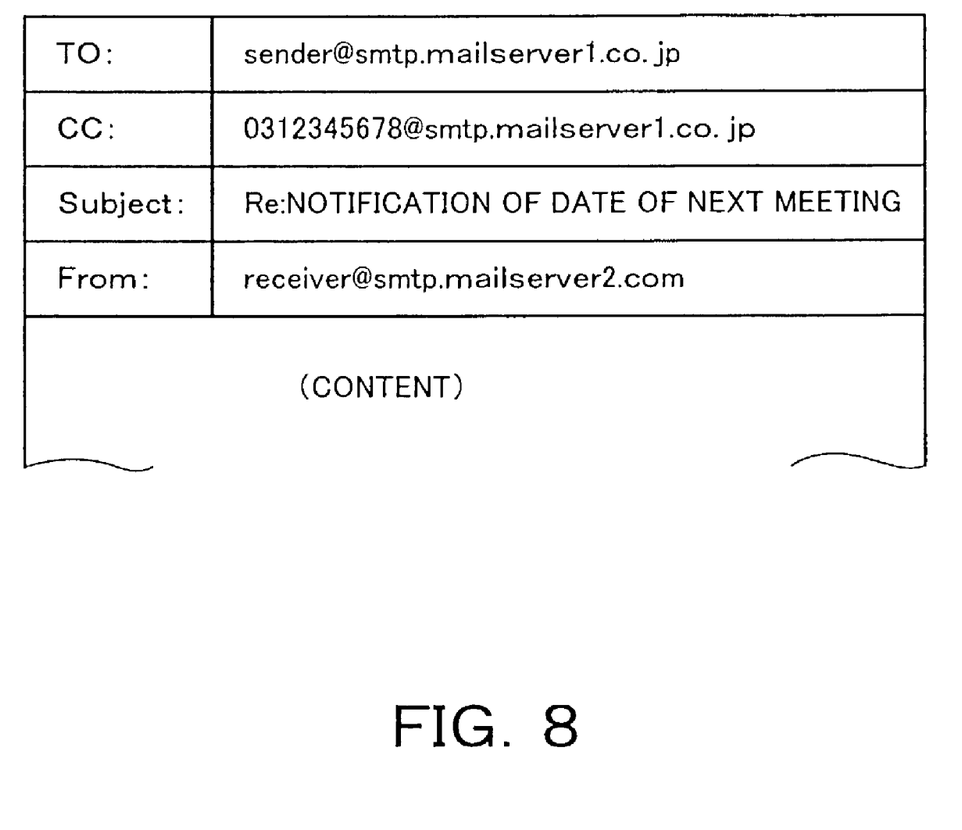
FIG. 8 is a drawing showing the structure of a reply mail.

FIG. 8 is a drawing showing the structure of this reply mail. This reply mail is created by the mail client (mail recipient 630) represented by the mail address receiver@smtp.mailserver2.com.

Drawing a comparison with the electronic mail of FIG. 7, the mail address "receiver@smtp.mailserver2.com" of the mail recipient 630 entered in the TO field of the electronic mail in FIG. 7 is moved to the From field, while the mail address "sender@smtp.mailserver1.co.jp" of the mail sender 610 entered in the From field of the electronic mail in FIG. 7 is moved to the TO field and the subject field contains "Re:", indicating that it is a reply mail, added to the original subject, to give "Re: Notification of date of next meeting". Also, the broadcast destination mail address "0312345678@smtp.mailserver1.co.jp" entered in the CC field of the electronic mail of FIG. 7 is entered in the CC field as the broadcast destination of this reply mail. In the event that the telephone number that has been changed to a mail address in the sending side mail delivery server as described above is entered in the TO field, it is possible to also enter it in the TO field of this reply mail.

If the reply mail having the structure shown in FIG. 8 is sent from the mail recipient 630 of FIG. 5, it is temporarily received by the recipient side mail delivery server 640. Here, since the telephone number (fax number) entered in the CC field of the reply mail of FIG. 8 is in a mail address format, no error occurs at the recipient side mail delivery server 640, and the reply mail shown in FIG. 8 is sent from the recipient side mail delivery server 640 through the Internet network 211 and is received by the sending side mail delivery server 500.

Figure 9:
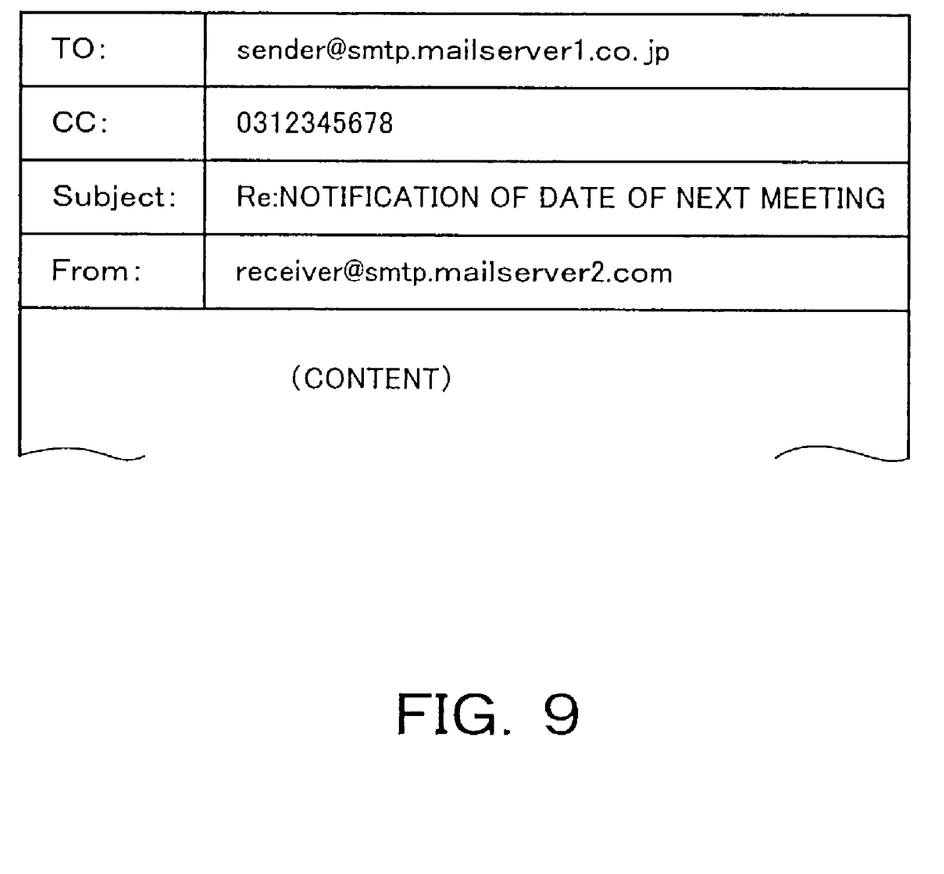
FIG. 9 is a drawing showing the structure of a reply mail after changing the reply mail shown in FIG. 8 at the sending side mail delivery server.

FIG. 9 is a drawing showing the structure of the reply mail after the reply mail shown in FIG. 8 has been changed by the sending side mail delivery server 500.

Compared to the reply mail shown in FIG. 8, the only difference is that the reply mail shown in FIG. 9 has the content of the CC field changed from mail address format to telephone number (fax number) format.

Due to the fact that a telephone number (fax number) is entered in the CC field in mail address format, the sending side mail delivery server 500 receiving the reply mail shown in FIG. 8 sends information for the same content as the content of the reply mail of FIG. 8 to that telephone number (fax number) "03-1234-5678" by fax, and changes that reply mail as shown in FIG. 9. The electronic mail having the structure shown in FIG. 9 is sent from the sending side mail delivery server 500 to the mail sender 610 in response to a request from the mail sender 610.

Figure 10:
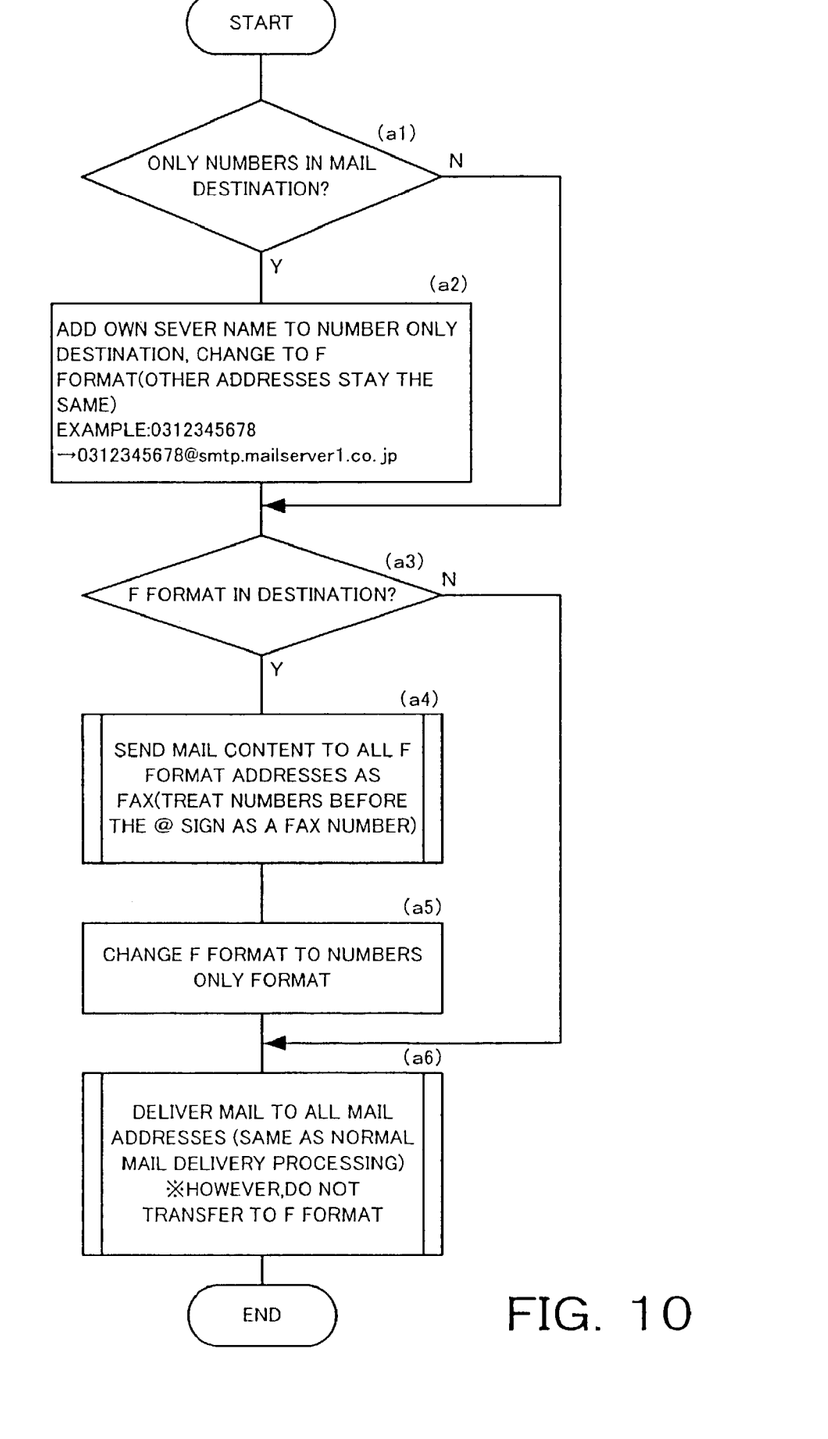
FIG. 10 is a flowchart showing processing at the sending side mail delivery server in the electronic mail system shown in FIG. 5.

FIG. 10 is a flowchart showing processing performed by the sending side mail delivery server 500 of the electronic mail system shown in FIG. 5.

If an electronic mail is received by the sending side mail delivery server 500, it is determined whether or not a destination of only numbers is entered in the destination field (combination of the TO field and the CC field) of that electronic mail (step al).

If there is a destination of only numbers, it is changed to F format by adding the server name "smtp.mailserver1.co.jp" to that destination comprising only numbers (step a2).

This F format means the destination's own server name added to the number, and in this example the destination becomes "0312345678@smtp.mailserver1.co.jp". Here, there is no additional change in the destination indicating a mail address format.

Next, it is determined whether or not F format is included in the destination of the received electronic mail (except for F format added in step a2) (step a3).

If any F format destinations are included, information of the same content as the content of the electronic mail is sent by fax to all the F format destinations (telephone number (fax number) formed of numbers before the @ sign) (step a4), and the F format destinations are changed to a format comprising only the numbers before the @ sign (step a5). Specifically, this step a5 is executed when an electronic mail is received from another mail delivery server (recipient side mail delivery server 640 of FIG. 5), and is not executed when sending electronic mail as a result of a request from the mail client administrating itself (mail sender 610 of FIG. 5).

In carrying out this processing, that electronic mail is delivered to all mail addresses (except F format mail addresses) (step a6).

In this way, it is possible to include a reply system using other communication means in an electronic mail system.

With the above described embodiment, description has been given taking transmission by fax (facsimile) as the other communication means mentioned in the present invention, but the other communication means of the present invention is not limited to fax and can also include, for example, transmission by telephone by converting the content of the electronic mail to voice, or any communication means other than electronic mail.

With the above described embodiment, the sending side mail delivery server 500 has an F format address created by adding its own address after a telephone number (fax number) entered in the electronic mail, but it is also possible to include a mail address formed by holding the telephone number (fax number) itself in the sending side mail delivery server 500, and adding its own address to an ID number or the like taking the place of that telephone number in an electronic mail.

Also with the above described embodiment, if an F format mail address is contained in the received electronic mail, an electronic mail that has been changed so that the F format email address is changed to a destination having only numbers is sent to the mail sender 610, but it is also possible to send an electronic mail (reply mail) having a structure containing the F format mail address shown in FIG. 8 to the sender, without changing this F format mail address.

What is claimed is:

1. A mail delivery server transmitting electronic mail to mail addresses described in a destination field of a received electronic mail, comprising:

communication means transmitting contents of the received electronic mail to a destination that uses a specified communication means other than electronic mail, when the destination that uses the specified communication means is included in the destination field of the received electronic mail; and an electronic mail transmitter changing the destination that uses the specified communication means described in the destination field of the received electronic mail to an electronic mail address comprising the destination and a domain of the mail delivery server, and transmitting said electronic mail message.

2. The mail delivery server of claim 1, wherein when the destination that uses the communication means is included in an electronic mail address format in the destination field of the received electronic mail, the electronic mail transmitter transmits the received electronic mail by returning the changed destination to a destination having a format used before the change to the electronic mail address format.

3. The mail delivery server of claim 1, wherein the electronic mail transmitter changes the destination that uses the specified communication means to an electronic mail address by adding its own address to the destination.

4. The mail delivery server of claim 1, wherein the communication means is facsimile.

5. A computer-readable medium storing a mail delivery program, causing a information processing device to function as a mail delivery server for sending electronic mail to mail addresses defined in a destination field of a received electronic mail, wherein said program causes said information processing act as a mail delivery server comprising:

communication means transmitting contents of the received electronic mail to a destination that uses a specified communication means other than electronic mail, when the destination that uses the other transmission means is included in the destination field of the received electronic mail; and an electronic mail transmitter changing the destination that uses the specified communication means described in the destination field of the received electronic mail to an electronic mail address comprising the destination and a domain of the mail delivery server, and transmitting said electronic mail message.

6. The computer-readable medium of claim 5, wherein, when a destination that uses the communication means is included in the destination field of the received electronic mail in an electronic mail address format, the electronic mail transmitter transmits the received electronic mail by returning the changed destination to a destination having a format used before the change to the electronic mail address format.

7. The computer-readable medium of claim 5, wherein the electronic mail transmitter changes the destination that uses the specified communication means to an electronic mail address by adding its own address to the destination.

8. The computer-readable medium of claim 5, wherein the communication means is facsimile.

9. A method of delivering mails that transmits electronic mail to mail addresses described in a destination field of a received electronic mail, comprising the steps of:

transmitting contents of a received mail to a destination that uses specified other transmission means besides electronic mail, using the other transmission means, in the event that the destination that uses the other transmission means is included in the destination field of the received electronic mail; and carrying out transmission by changing the destination that uses the other transmission means described in the destination field of the received electronic mail to an electronic mail address comprising the destination and a domain of the mail delivery server.

10. The method of claim 9, wherein the step of carrying out transmission by changing the destination that uses the other transmission means comprises, when a destination that uses the other communication means is included in an electronic mail address format in the destination field of the received electronic mail, transmitting the received electronic mail by returning the changed destination to a destination having a format used before the change to the electronic mail address format.

11. The method of claim 9, wherein the step of carrying out transmission by changing a destination that uses the other transmission means comprises changing the destination that uses the other transmission means to an electronic mail address by adding its own address to the destination.

12. The method of claim 9, wherein the other communication means is facsimile.

* * * * *